United States Patent [19]

Bacon et al.

[11] Patent Number: 5,427,348
[45] Date of Patent: Jun. 27, 1995

[54] MOUNTING FOR A GAS TURBINE ENGINE

[75] Inventors: Richard A. E. Bacon; Trevor H. Speak, both of Dursley, England

[73] Assignee: Rolls-Royce plc, London, England

[21] Appl. No.: 132,250

[22] Filed: Oct. 6, 1993

[30] Foreign Application Priority Data

Oct. 12, 1992 [GB] United Kingdom ............... 9221400

[51] Int. Cl.⁶ ............................................. F16M 13/00
[52] U.S. Cl. ..................................... 248/555; 244/54
[58] Field of Search ............... 248/554, 555; 60/39.31; 244/54

[56] References Cited

U.S. PATENT DOCUMENTS

| | | | |
|---|---|---|---|
| 3,844,115 | 10/1974 | Freid | 60/39.31 |
| 5,303,880 | 4/1994 | Cencula et al. | 244/54 |
| 5,320,307 | 6/1994 | Spofford et al. | 244/54 |

FOREIGN PATENT DOCUMENTS

| | | |
|---|---|---|
| 0147878 | 11/1984 | European Pat. Off. . |
| 787739 | 12/1957 | United Kingdom . |
| 798832 | 7/1958 | United Kingdom . |
| 827027 | 2/1960 | United Kingdom . |
| 969806 | 5/1962 | United Kingdom . |
| 2049817 | 12/1980 | United Kingdom . |
| 2202279 | 9/1988 | United Kingdom . |

Primary Examiner—Karen J. Chotkowski
Assistant Examiner—Catherine S. Collins
Attorney, Agent, or Firm—Oliff & Berridge

[57] ABSTRACT

In a mounting for a gas turbine engine, the engine is pivotally mounted about its center of gravity to an aircraft support structure by means of a pair of radially outwardly extending trunnions. Each trunnion is connected to a central conical section of engine casing by means of an axially extending intermediate support member. The support member is secured to the downstream end of the conical casing section at an axial location offset from the trunnion. During operation distortion of the less stiff conical section is reduced by virtue of the resultant shear force distribution across the casing.

9 Claims, 4 Drawing Sheets

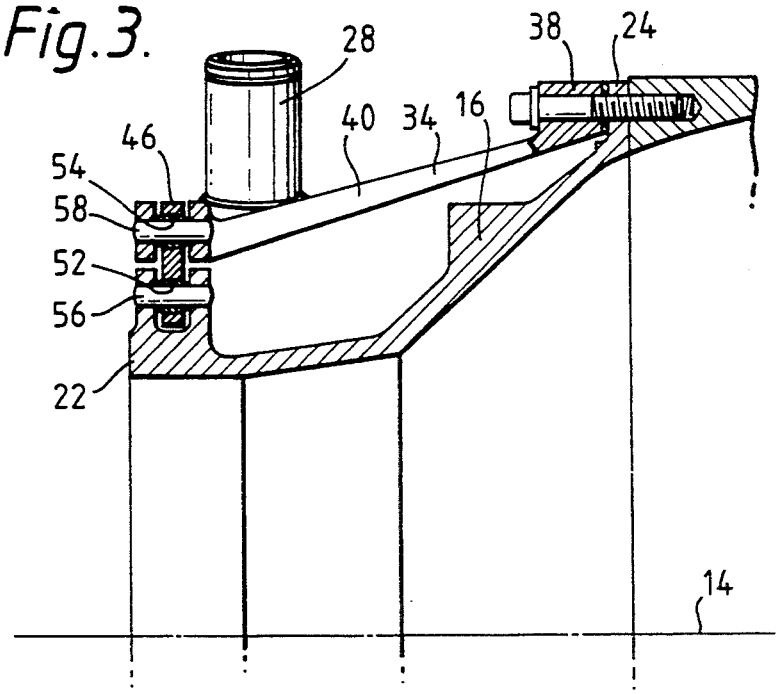
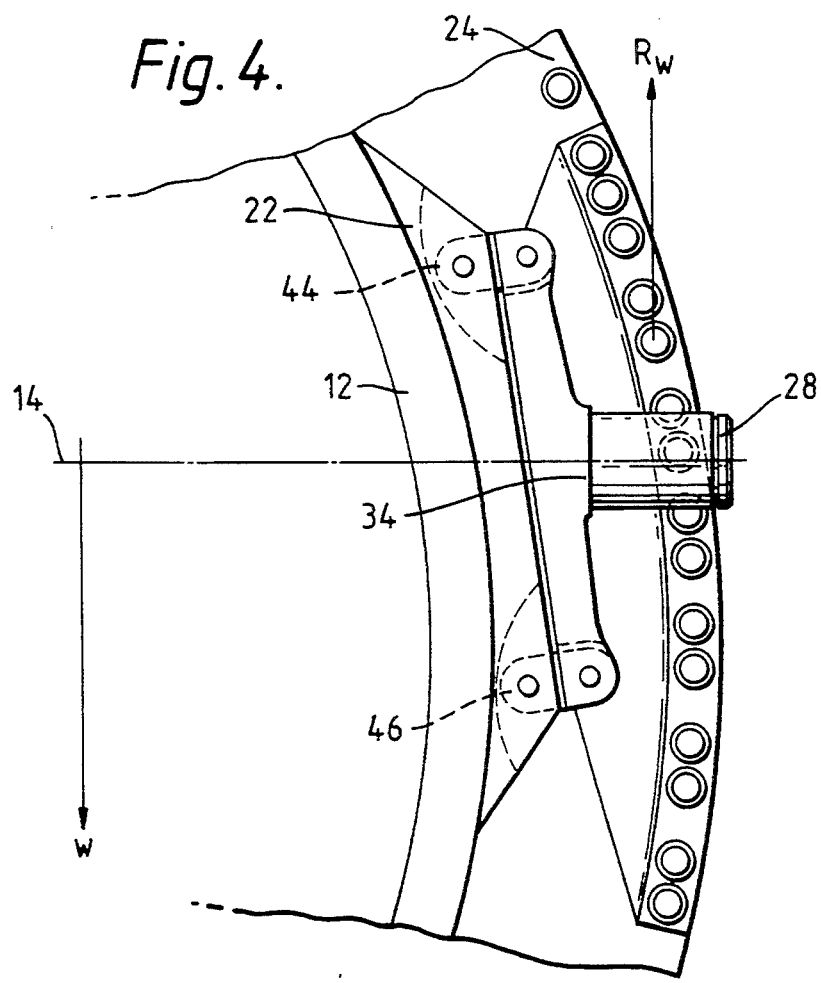

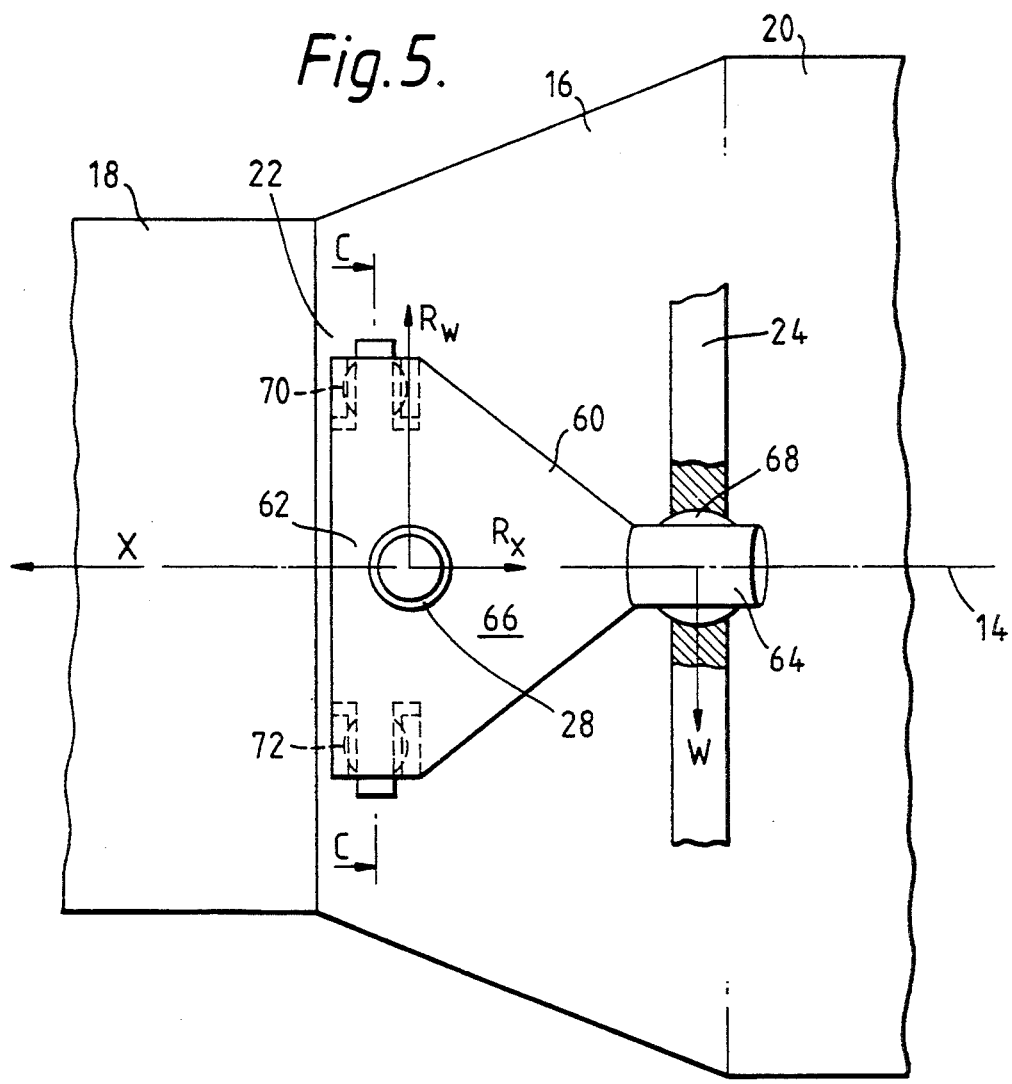
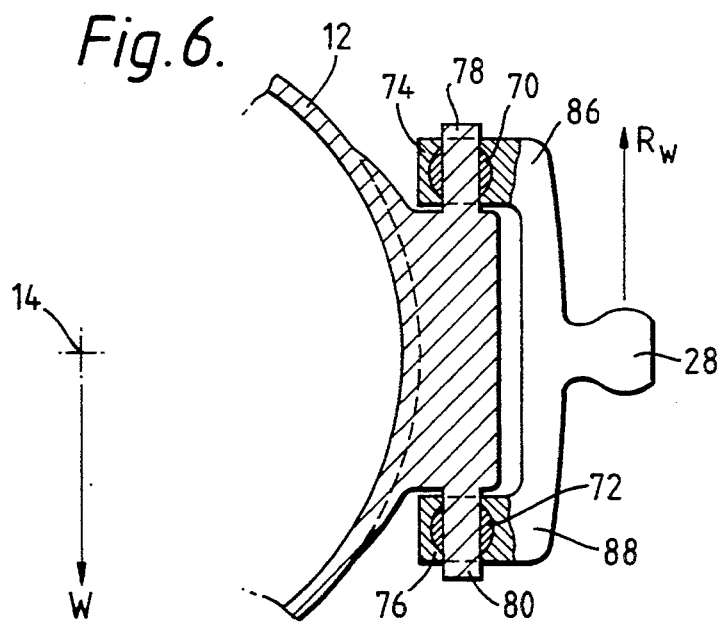

MOUNTING FOR A GAS TURBINE ENGINE

BACKGROUND OF THE INVENTION

The present invention relates to a mounting for gas turbine engines, and in particular, to a trunnion mounting arrangement for aircraft mounted gas turbine engines.

It is often desirable to mount aircraft gas turbine engines to surrounding support structures by means of a pair of laterally disposed trunnions.

In known arrangements the trunnion mounting members typically connect the engine casing to the supporting structure in a single plane transverse to the engine axis. Usually the trunnions support the engine about its center of gravity and as such are typically connected directly to a central section of the engine's casing.

Unfortunately problems associated with engine case distortion can arise in engines mounted this way. When the trunnion members are connected directly to the engine casing, the shear forces and bending moments acting on the engine casing due to engine weight, typically act to deflect the engine casing in the same sense. When the engine casing is subject to substantial vertical "g" loads, for example during aircraft manoeuvres, this characteristic can lead to significant casing distortion and rotor tip rubs.

Obviously problems such as these could be overcome at the expense of engine weight simply by increasing the thickness of selective sections of engine casing.

However, as with all aircraft related components such casings are designed to be of relatively lightweight construction compared with non-aircraft structures subject to similar loadings.

In mounting gas turbine engines it is, therefore, necessary to give careful consideration to the manner in which engine loads are transferred to the supporting structure; and with regard to engine case distortion in particular, it is necessary to consider the manner in which the supporting structure reacts the loads into the engine casing.

Accordingly, it is an objective of the present invention to provide a trunnion mounting arrangement for a gas turbine engine which reduces engine casing distortions, without adding appreciably to the weight of the engine.

SUMMARY OF THE INVENTION

According to the invention there is provided a trunnion mounting arrangement for pivotally connecting a gas turbine engine to a support structure, the engine having:

a main axis, and a structural casing generally cylindrical about the main axis, the mounting comprising:

a pair of trunnion mounting members which define a trunnion axis orthogonal to the main axis, a pair of intermediate support members which carry the trunnion members and are attached to opposite sides of the casing by first and second connection means spaced apart axially, the first connection means being adapted to transfer all shear loads acting on the casing due to engine weight from the casing to the intermediate support members in a first plane orthogonal to the main axis and spaced apart from the trunnion axis, and the second connection means being adapted to transfer all additional loads in a second plane orthogonal to the main axis, the arrangement being such that the engine casing forward of the first plane experiences shear forces in one sense and rearwards thereof shear forces in an opposite sense.

BRIEF DESCRIPTION OF THE DRAWINGS

The invention will now be described in greater detail with reference, by way of example only, to the accompanying drawings, in which:

FIG. 3 is a sectional view of the engine mount shown in FIG. 2 when viewed in the direction of arrows A—A, FIG. 4 is a view of the engine mount shown in FIG. 2 when viewed in the direction of arrow B, FIG. 5 is an enlarged view of the engine mount on one side of the engine shown in a second preferred embodiment, FIG. 6 is a sectional view of the engine mount shown in FIG. 5 when viewed in the direction of arrows C—C.

DESCRIPTION OF THE PREFERRED EMBODIMENTS

Figure 1:
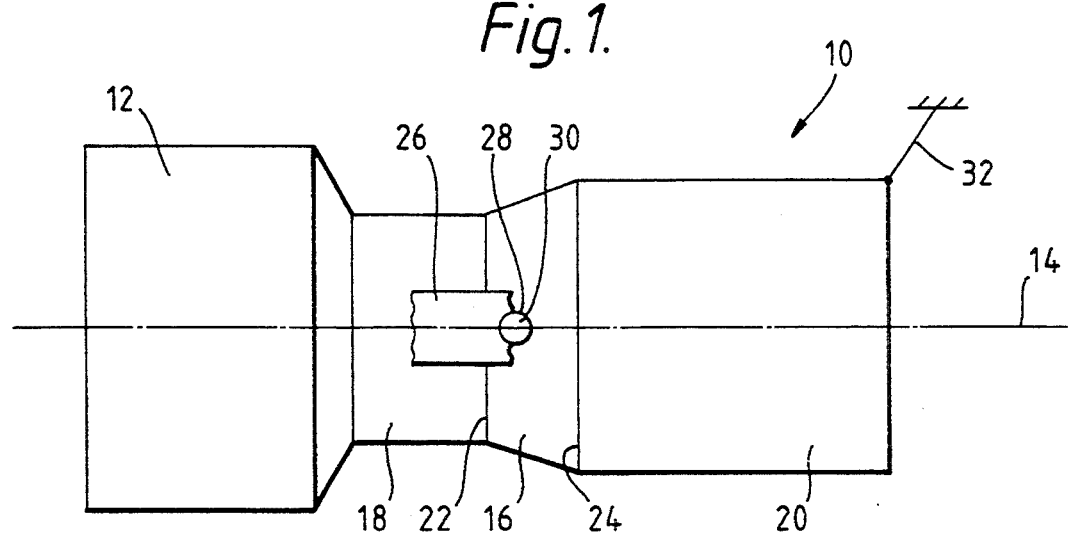
FIG. 1 is a side view of a gas turbine engine having a mounting arrangement in accordance with the present invention.

Referring to FIG. 1, there is shown a gas turbine engine 10 having a structural outer casing 12. The casing comprises a plurality of sections which are bolted together to form a generally cylindrical structure having a longitudinal centre axis 14. The casing includes a central conical section 16 which is joined to respective upstream and downstream sections 18 and 20 at front and rear annular flanged joints 22 and 24.

The engine is pivotally connected to an aircraft support structure 26 by means of a pair of radially outwardly extending trunnions 28. Trunnion mounting members 28 together define an axis 30. The trunnions, which are each connected to opposite sides of conical section 16, engage the aircraft support structure directly at respective spaced apart locations. Together the trunnions prevent vertical, lateral, and axial movement of the engine with respect to the support structure. The engine is further connected to the aircraft support structure at its downstream end by means of a linkage 32. The linkage simply prevents rotational movement of the engine relative to the aircraft structure, and as such supports relatively no load at all.

Figure 2:
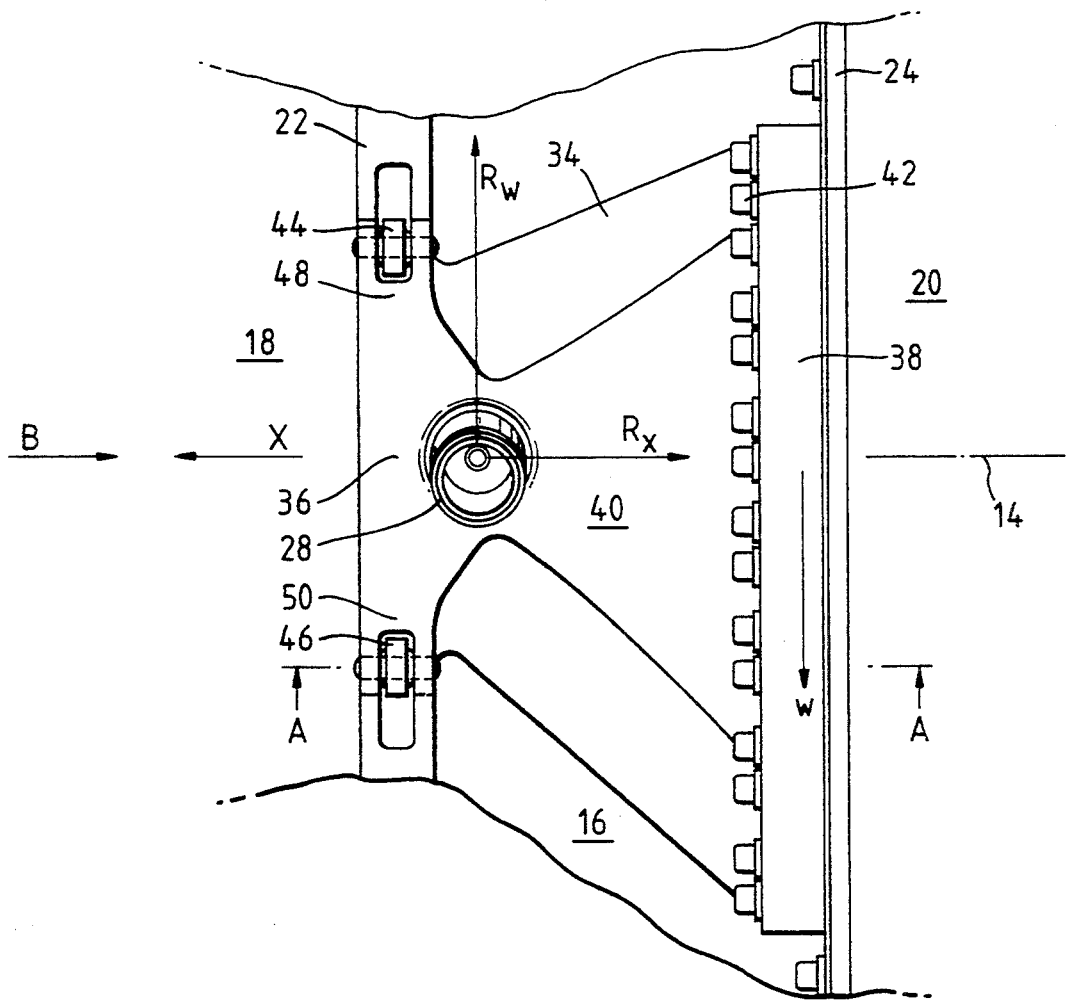
FIG. 2 is an enlarged view of the engine mount on one side of the engine, shown in a first preferred embodiment.

Referring now to FIG. 2 which shows a first embodiment of the invention. Each trunnion is connected to the engine casing by means of an axially extending intermediate support member 34. The support member includes a front flange 36, a rear flange 38, and a central web section 40. The trunnion mounting member 28 is secured to the web of the support member and extends radially outwards therefrom. Rear flange 38 extends circumferentially around the engine casing at flanged joint 24, and is secured thereto by means of a plurality of circumferentially spaced bolts 42.

The support member is further connected to the engine casing at flanged joint 22 by means of a pair of link elements 44 and 46. The link elements connect respective top and bottom ends 48 and 50 of front flange 36 to the engine casing at circumferentially spaced apart locations. As shown in FIG. 3, each link element comprises a first end rotatably mounted to the engine casing by means of a spherical bearing 52, and a second end similarly rotatably mounted to the support member by means of a spherical bearing 54. Spherical bearings 52 and 54 are themselves located on pins 56 and 58 which are secured to the engine casing and the support member respectively. In this manner the link elements are capable of supporting lateral loads only.

The various forces acting on the mounting will now be considered. Referring to FIG. 2, during operation the thrust produced by the engine, represented by arrow X, acts along axis 14. The engine thrust is applied to the aircraft support structure equally by each trunnion. Accordingly, the engine thrust is reactively applied to the engine casing by each trunnion in the direction of arrow Rx. Similarly, and with reference to FIG. 4, vertical force W, due to engine weight, is applied to the aircraft support structure equally by each trunnion. This force is reactively applied to the engine casing by each of the trunnions in the direction of arrow Rw.

As will be appreciated with reference to FIG. 2, all axial and vertical engine loads transmitted to the aircraft support structure, act through the bolted rear flanges 38 of the respective support members. As indicated in FIG. 4, link elements 44 and 46, whilst not supporting either axial or vertical engine loads, react the couple generated by the vertical reaction force Rw acting on the trunnion. This prevents the support member from twisting excessively at front flange 36. In this arrangement the engine casing forward of annular flanked joint 24 experiences a condition of shear in one sense and the casing rearwards thereof a condition of shear in an opposing sense. This is typical of any generally uniformly loaded structure supported at a single location along its length. In this case the resultant distribution of shear force across the engine casing is desirable, since the shear forces act to distort the less stiff conical section 16 in a sense opposite to that of the resultant axial bending couple. The overall effect is thus to reduce distortion of the engine casing during aircraft manoeuvres.

Referring now to FIG. 5, which shows a second embodiment of the invention. Each trunnion is connected to the engine casing by means of an axially extending support member 60. The support member includes an upstream portion 62, a central portion 66, and a downstream portion 64. The trunnion mounting member is secured to the central portion of the support member and extends radially outwards therefrom. Downstream portion 64 comprises an axially extending cylindrical member which is secured to the engine casing at flanged joint 24 by means of spherical bearing 68. The support member is further connected to the engine casing at flanged joint 22 by means of spherical bearings 70 and 72. As shown in FIG. 6, spherical bearings 70 and 72 are located in lugs 74 and 76, which extend towards the engine casing from respective top and bottom ends 86 and 88 of the upstream portion 62 of the support member. Spherical bearings 70 and 72 each locate on respective spaced apart coaxial pins 78 and 80, which are fixedly secured to the engine casing at flange joint 22. The arrangement is such that spherical bearings 70 and 72 support axial and lateral loads only, whilst spherical bearing 64 supports vertical and lateral loads only.

Figure 7:
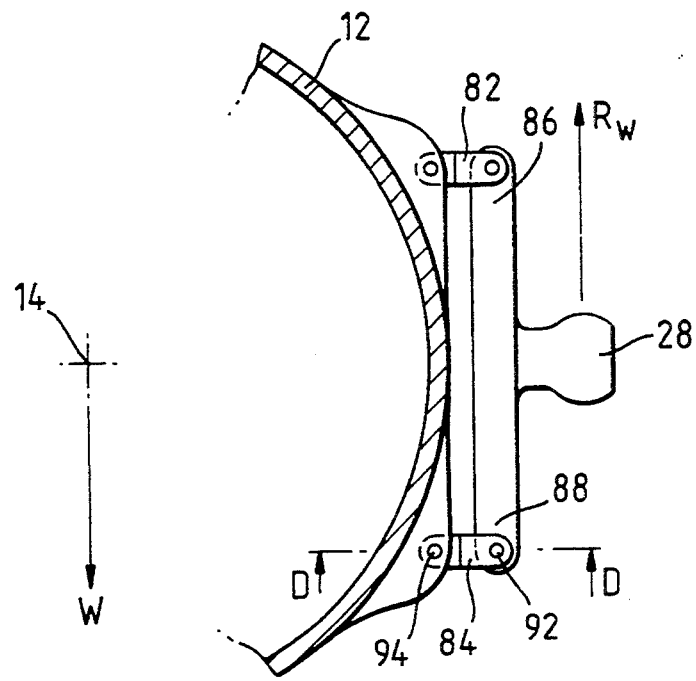
FIG. 7 is a sectional view of the engine mount shown in FIG. 5 when viewed in the direction of arrows C—C, in an alternative arrangement to FIG. 6.
Figure 8:
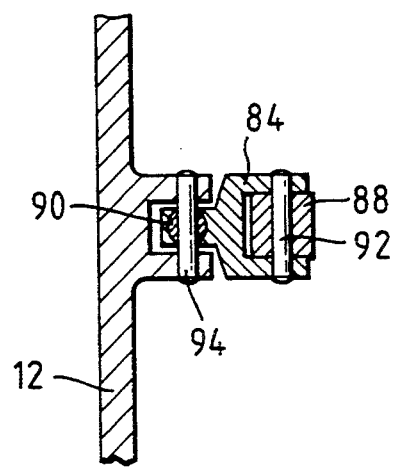
FIG. 8 is a sectional view of the engine mount shown in FIG. 7 when viewed in the direction of arrows D—D.

In an alternative arrangement, as shown in FIG. 7, support member 60 is connected to the engine casing at flanged joint 22 by means of a pair of link elements 82 and 84. The link elements similarly connect respective top and bottom ends 86 and 88 of upstream portion 62 to the engine casing at circumferentially spaced apart locations. As shown in FIG. 8, each link element comprises a first end rotatably mounted to the engine casing by means of a spherical bearing 90, and a second end rotatably mounted to the support member by means of a pin 92. Spherical bearing 90 is itself located on a pin 94 which is secured to the engine casing. Like spherical bearings 74 and 76 in the previous arrangement, link elements 82 and 84 are capable of supporting axial and lateral loads only.

The various forces acting on the mounting of the second preferred embodiment will now be considered. Referring to FIG. 5, the engine forces X and W act on the trunnions as previously described, and as such all vertical engine loads transmitted to the aircraft support structure, act through spherical bearing 68. It therefore follows that in this embodiment the engine casing is subject to the same overall shear force distribution as the first embodiment. As shown in FIG. 6, spherical bearings 72 and 74 react the couple generated by the vertical reaction force Rw in the radial circumferential engine plane. Spherical bearings 72 and 74 also react the couple generated by the applied and reaction forces W and Rw in the vertical engine axial plane. Likewise, link elements 82 and 84 of the alternative arrangement shown in FIG. 7, react the couple generated by the vertical reaction force Rw in the radial circumferential engine plane, and similarly the couple generated by the applied and reaction forces W and Rw in the vertical axial engine plane.

This couple, which arises as a result of the axial offset between spherical bearing 68 and the trunnion, is reactively applied to the engine casing at flanged joint 22. This results in the overall bending couple across the conical section being reduced, as the bending couple generated by the offset opposes the bending couple generated by the engine weight. Consequently the engine casing experiences a more favourable distribution of axial bending moment. The overall effect is thus to reduce still further the distortion of the engine casing due to vertical engine loads during aircraft manoeuvres.

We claim:

1. A gas turbine engine mounting arrangement, comprising:

an engine casing generally cylindrical about a main engine axis;

a pair of trunnion mounting members which define a trunnion axis orthogonal to the main axis; and a pair of intermediate support members which carry the trunnion members, the intermediate support members being attached to opposite sides of the casing by first and second connection means spaced apart axially, the first connection means being adapted to transfer all shear loads acting on the engine casing due to engine weight from the casing to the intermediate support members in a first plane orthogonal to the main axis and spaced apart from the trunnion axis- , and the second connection means being adapted to transfer other loads in a second plane orthogonal to the main axis;

whereby the engine casing forward of the first plane experiences shear forces in one sense and rearwards thereof shear forces in an opposite sense.

2. A gas turbine engine mounting arrangement as claimed in claim 1 wherein the first connection means comprise a plurality of retaining bolts which rigidly secure the intermediate support member to the engine casing.

3. A gas turbine engine mounting arrangement as claimed in claim 1 wherein the first connection means comprises a spherical bearing which locates the intermediate support member on the engine casing, the spherical bearing being arranged to transfer vertical and lateral engine loads between the engine casing and the intermediate support member.

4. A gas turbine engine mounting arrangement as claimed in claim 2 wherein the second connecting means comprises a pair of pivoted link elements which connect to the engine casing at circumferentially spaced locations, including means for rotatably mounting a first end of each link to the engine casing and means for rotatably mounting a second end of each link to the intermediate support member.

5. A gas turbine engine mounting arrangement as claimed in claim 4 wherein means for rotatably mounting a first end of each link to the engine casing and means for rotatably mounting a second end of each link to the intermediate support member comprise spherical bearings arranged such that the links transfer lateral engine loads only.

6. A gas turbine engine mounting arrangement as claimed in claim 4 wherein means for rotatably mounting a first end of each link to the engine casing comprises a spherical bearing and means for rotatably mounting a second end of each link to the intermediate support member comprises a pin, the respective spherical bearings and pins being arranged such that the links transfer lateral and axial loads only.

7. A gas turbine engine mounting arrangement as claimed in claim 2 wherein the second connecting means comprises a pair of spherical bearings which locate the intermediate support member on the engine casing at circumferentially spaced apart locations, the spherical bearings being arranged to transfer lateral and axial loads between the engine casing and the intermediate support member.

8. A gas turbine engine mounting arrangement as claimed in claim 1 wherein the engine casing comprises a conical section between the first and second connecting means.

9. A gas turbine engine mounting arrangement as claimed in claim 1 wherein the engine casing is provided with a further mount which prevents rotational movement of the engine relative to the support structure.

* * * * *